(12) United States Patent
Nito et al.

(10) Patent No.: US 8,976,915 B2
(45) Date of Patent: Mar. 10, 2015

(54) ADJACENT-CHANNEL INTERFERENCE REJECT FILTER DEVICE, WIRELESS COMMUNICATION DEVICE, AND KEYLESS ENTRY DEVICE

(71) Applicant: Kabushiki Kaisha Toshiba, Tokyo (JP)

(72) Inventors: Yoshiharu Nito, Kanagawa (JP); Tsuneo Suzuki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 20 days.

(21) Appl. No.: 13/791,595

(22) Filed: Mar. 8, 2013

(65) Prior Publication Data

US 2013/0251081 A1 Sep. 26, 2013

(30) Foreign Application Priority Data

Mar. 26, 2012 (JP) .................................. 2012-069881

(51) Int. Cl.
*H04B 1/10* (2006.01)
(52) U.S. Cl.
CPC ................ *H04B 1/10* (2013.01); *H04B 1/1036* (2013.01)
USPC ........... 375/350; 375/285; 375/295; 375/316; 375/340; 375/347
(58) Field of Classification Search
CPC ......... G04G 17/02; G04G 9/105; G04G 9/10; G04G 5/04; G04G 9/0017; G04G 9/087; G04G 9/102; G04G 9/107; G06F 13/4295; G09G 5/003; H02P 23/0045; H02P 27/08; H03K 5/06; H03K 17/06; H03K 17/0822

USPC ......... 375/259, 285, 295, 316, 322, 340, 346, 375/347, 348, 350, 355, 371

See application file for complete search history.

(56) References Cited

U.S. PATENT DOCUMENTS

| 3,688,037 | A  | * | 8/1972 | Ipri ............................... 348/548 |
| 3,858,205 | A  | * | 12/1974 | Ross .................................. 342/21 |
| 4,672,658 | A  | * | 6/1987 | Kavehrad et al. ............. 455/555 |
| 6,417,707 | B1 | * | 7/2002 | Underhill et al. ............. 327/165 |
| 6,934,246 | B2 | * | 8/2005 | Park .............................. 370/208 |

(Continued)

FOREIGN PATENT DOCUMENTS

| JP | 554-103619 A | 8/1979 |
| JP | H01-276816 A | 11/1989 |

(Continued)

OTHER PUBLICATIONS

Japanese Office Action, Patent Application No. 2012-069881, dated Jun. 13, 2014.

*Primary Examiner* — Hirdepal Singh
(74) *Attorney, Agent, or Firm* — Patterson & Sheridan LLP

(57) ABSTRACT

According to one embodiment, an adjacent-channel interference reject filter comprises a short-pulse inverter which includes a short-pulse sensor configured to detect a pulse in an intermediate frequency signal supplied to the device. The short-pulse sensor detects pulses having a pulse width less than or equal to some predetermined width. The short-pulse inverter also includes a pulse inverter configured to invert the pulse detected by the short-pulse sensor. The adjacent-channel interference reject filter may also include an inversion controller to control the inverting of detected short pulses. An adjacent-channel interference reject filter may be included in various devices such as wireless communication devices.

20 Claims, 10 Drawing Sheets

(56) References Cited

U.S. PATENT DOCUMENTS

| | | | |
|---|---|---|---|
| 7,027,505 B2* | 4/2006 | Al-Eidan | 375/240 |
| 7,848,222 B2* | 12/2010 | Wang et al. | 370/212 |
| 8,737,100 B2* | 5/2014 | Chapman et al. | 363/95 |
| 2002/0131530 A1* | 9/2002 | Zhang | 375/340 |
| 2003/0048131 A1 | 3/2003 | Kohsiek | |
| 2003/0087622 A1* | 5/2003 | Jayaraman et al. | 455/307 |
| 2003/0112044 A1* | 6/2003 | Yin | 327/172 |
| 2003/0118083 A1* | 6/2003 | Li | 375/147 |
| 2008/0008253 A1* | 1/2008 | Sugiura | 375/243 |
| 2008/0031386 A1* | 2/2008 | Tsai et al. | 375/340 |
| 2008/0055150 A1* | 3/2008 | Hou et al. | 342/40 |
| 2009/0225905 A1* | 9/2009 | Suzuki | 375/334 |
| 2010/0194623 A1* | 8/2010 | Hansen | 342/52 |
| 2010/0285768 A1 | 11/2010 | Taira et al. | |
| 2012/0288042 A1* | 11/2012 | Chen et al. | 375/345 |

FOREIGN PATENT DOCUMENTS

| | | |
|---|---|---|
| JP | 2003133984 | 5/2003 |
| JP | 2007-142879 A | 6/2007 |
| JP | 2007-288325 A | 11/2007 |
| JP | 2008-047990 A | 2/2008 |
| JP | 2010263429 | 11/2010 |

* cited by examiner

ADJACENT-CHANNEL INTERFERENCE REJECT FILTER DEVICE, WIRELESS COMMUNICATION DEVICE, AND KEYLESS ENTRY DEVICE

CROSS-REFERENCE TO RELATED APPLICATION

This application is based upon and claims the benefit of priority from Japanese Patent Application No. 2012-069881, filed Mar. 26, 2012, the entire contents of which are incorporated herein by reference.

FIELD

Embodiments described herein relate to an adjacent-channel interference reject filter to reject interference signals, a wireless communication device and a keyless entry device.

BACKGROUND

In a conventional FM demodulation system that uses low IF (intermediate frequency) signals with frequencies of several hundred kHz and various structures such as an analog IF filter or an analog-to-digital converter (ADC) and a digital IF filter or a combination of an analog IF filter and a digital IF filter have been used to reject the interference signals contained in received signals.

In a structure with an analog IF filter, the properties of the analog IF filter can be affected by temperature and element variations. In addition, it is difficult to reject the interference signals completely with an analog IF filter due to its mild filtering properties. In addition, it is necessary to make a complex internal structure with an analog IF filter to increase its performance in rejecting the interference signals, which increases the size of a circuit.

If the structure uses a digital IF filter, then the intended filtering properties can be obtained by using a digital process; however, the use of an ADC because it increases the consumption of electric current and typically requires a very high signal-to-noise (S/N) ratio.

In a structure with a combination of an analog IF filter and a digital IF filter, it is possible to pass the signal through the ADC and digital IF filter after removing some of the interference signal using an analog IF filter, which limits the ADC spec required. However, the size of the circuit is still large due to the need to use two types of filters and an ADC, thereby making the overall structure complex.

DETAILED DESCRIPTION

The present disclosure describes an adjacent-channel interference reject filter that can efficiently reject interference signals, a wireless communication device, and a keyless entry device with a simple structure. In general, a detailed description according to one embodiment of the present disclosure will be described with reference to the drawings.

According to an embodiment of the present disclosure a signal filter (an adjacent-channel interference reject filter) includes a short-pulse inverter, which includes a short-pulse sensor configured to detect a pulse in an IF (intermediate frequency) signal having a pulse width less than or equal to a predetermined width, and a pulse inverter configured to invert the pulse detected by the short-pulse sensor.

An adjacent-channel interference reject filter may also include an inversion controller to control whether pulses with a pulse width less than a specified standard width from the input IF (intermediate frequency) signals are to be inverted and a pulse inverter (short-pulse inverter) to invert the short pulses that the inversion controller has decided to invert.

First Embodiment

Figure 1:
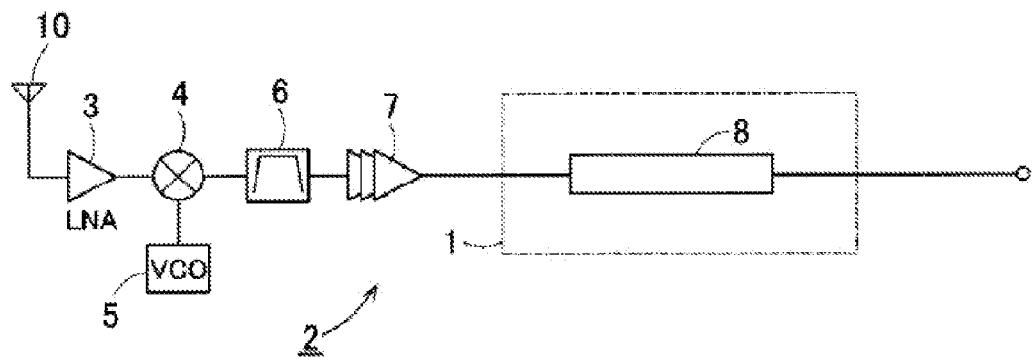
FIG. 1 is a block diagram depicting the schematic structure of a wireless communication device provided with an adjacent-channel interference filter according to a first embodiment.

FIG. 1 is a block diagram depicting the schematic structure of a wireless communication device 2 provided with an adjacent-channel interference reject filter 1 according to the first embodiment. As a more specific example, the wireless communication device 2 shown in FIG. 1 can be an FM-receiving device that receives FM (frequency modulated) signals. The FM signals are not over-the-air waves but rather FM modulated data. Therefore, the wireless communication device 2 shown in FIG. 1 may be assumed to be used for data communication in this example. Any data can be sent and received by using data communication. For example, as described later, various types of commands for a keyless entry system can be sent and received.

The wireless communication device 2 shown in FIG. 1 is provided with a low-noise amplifier (LNA) 3 to amplify RF (Radio Frequency) signals that are received by an antenna 10, a mixer 4 to convert RF signals to IF signals, a voltage-controlled oscillator (VCO) 5 that generates a local oscillation signal to down-convert RF signals to generate an IF signal, an analog IF filter 6 that rejects the interference signals contained in the IF signals, a limiting amplifier and an adjacent-channel interference reject filter 1.

The limiting amplifier 7 outputs IF signals that were passed through the analog IF filter 6 as digital data. The adjacent-channel interference reject filter 1 has a short-pulse inverter 8. The short-pulse inverter 8 detects the short pulses in the IF signals output from the limiting amplifier 7 that have a pulse width less than or equal to the specified standard width and inverts at least some portion of them.

Figure 2:
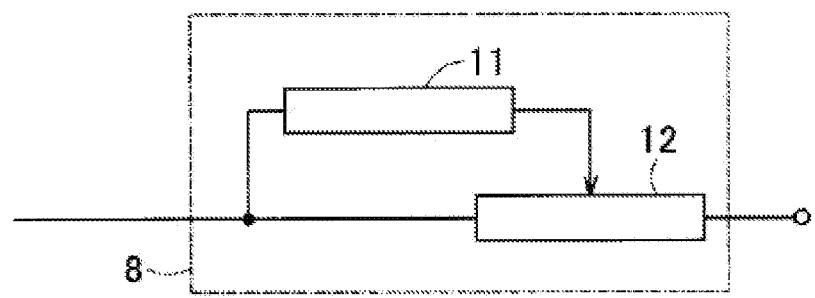
FIG. 2 is a block diagram depicting an example of an internal structure of a short-pulse inverter.

FIG. 2 is a block diagram depicting an example of the internal structure of the short-pulse inverter 8. The short-pulse inverter 8 shown in FIG. 2 has a short-pulse sensor 11 and a pulse inverter 12. The short-pulse sensor 11 detects the short pulses from the IF signals that have pulse widths less than or equal to the specified standard width. The pulse inverter 12 inverts the short pulses detected by the short-pulse sensor 11.

Figure 3:
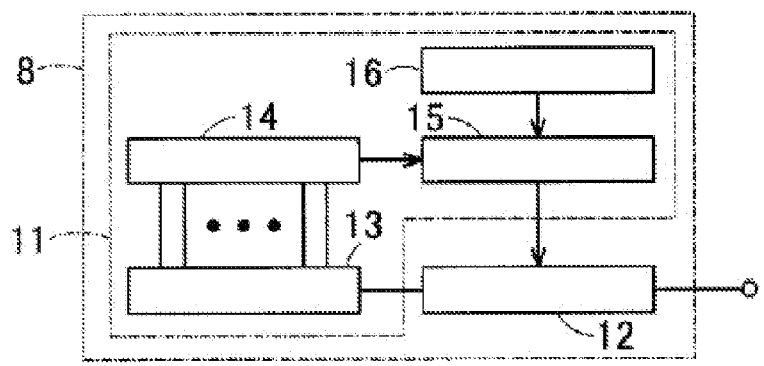
FIG. 3 is a block diagram depicting an example of the internal structure of a short-pulse sensor.

FIG. 3 is a block diagram depicting an example of the internal structure of the short-pulse sensor 11 in FIG. 2. The short pulse sensor 11 shown in FIG. 3 has a shift register 13, a pulse-width sensor 14, a short pulse-determining unit 15 and a detected-threshold level controller 16.

The shift register 13 takes a sampling of the IF signals at a constant frequency. The pulse-width sensor 14 counts the sampling number between signal edges of the IF signals and then detects the pulse width from the counted sampling number. The short pulse-determining unit 15 compares the pulse width detected by the pulse-width sensor 14 with the threshold level set by the detected-threshold level controller (detection-threshold level controller) 16 and then determines whether it is short pulse.

Which pulses determined to be a short pulse by the short pulse-determining unit 15 can be adjusted by controlling the threshold level using the detected-threshold level controller 16.

Figure 4:
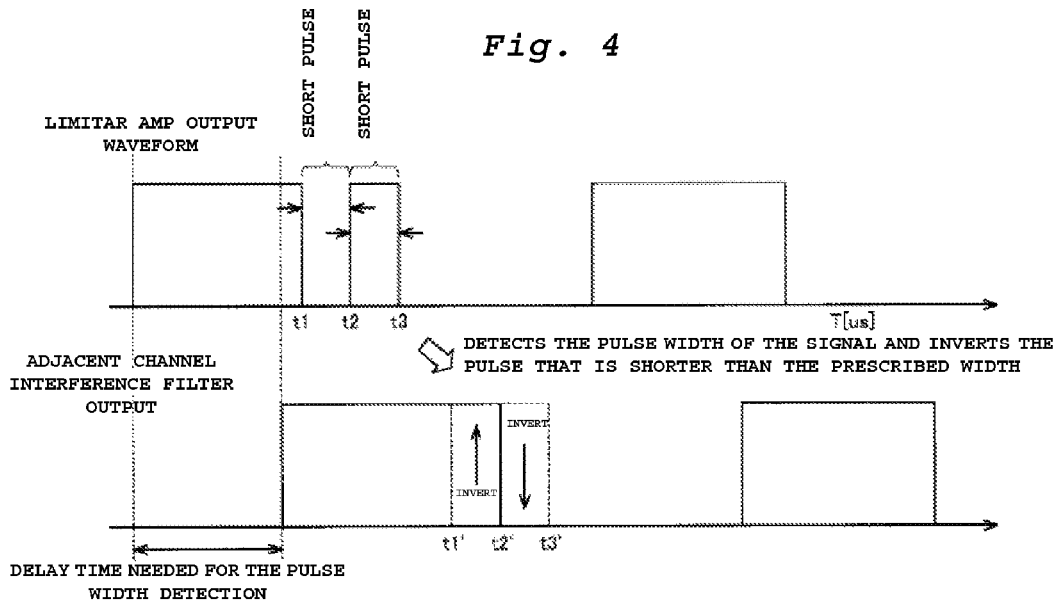
FIG. 4 is a diagram depicting the operation of a short-pulse inverter.

FIG. 4 is a diagram describing the operation of the short-pulse inverter 8 in FIG. 1 and indicates the signal waveforms of the IF signals that are output from the limiting amplifier 7 and of the signal waveforms that are output from the adjacent-channel interference reject filter 1. The IF signals are entered into the shift register 13 shown in FIG. 3 and retain the plurality of their periodic components; therefore, the signals output from the adjacent-channel interference reject filter 1 get delayed by the specified time relative to the IF signals.

The IF signals shown in FIG. 4 contain negative short pulses between times t1 and t2 and positive short pulses between times t2 and t3. Therefore, the short-pulse sensor 11 in the adjacent-channel interference reject filter 1 detects the negative short pulses during the time t1" to t2" and the pulse inverter 12 inverts the pulses. Next, the short-pulse sensor 11 detects the positive short pulses during the time t2' to t3', and the pulse inverter 12 inverts the pulses.

Due to these inversions, as shown in FIG. 4, the short pulses are no longer present in the signals that are output from the adjacent-channel interference reject filter 1.

Figure 5:
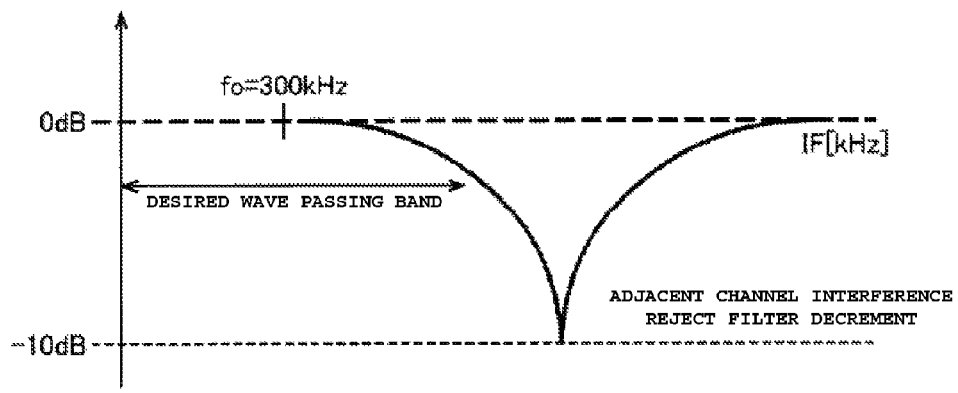
FIG. 5 is a graph depicting the attenuation properties of the adjacent-channel interference reject filter according to the first embodiment.

FIG. 5 is a graph depicting the attenuation properties of the interference signals that are output from the adjacent-channel interference reject filter 1 shown in FIG. 1 to FIG. 3 in which the horizontal axis is the frequency (kHz) that is output from the adjacent-channel interference reject filter 1, and the vertical axis is the attenuation level (dB).

The adjacent-channel interference reject filter 1 shown in FIG. 1 to FIG. 3 inverts all of the short pulses detected by the short-pulse inverter 8. In the sensitive range, short pulses are generated due to noise, and thus, the desired signal also gets inverted. Due to this inversion, the sensitivity of the desired signal is degraded.

Figure 6:
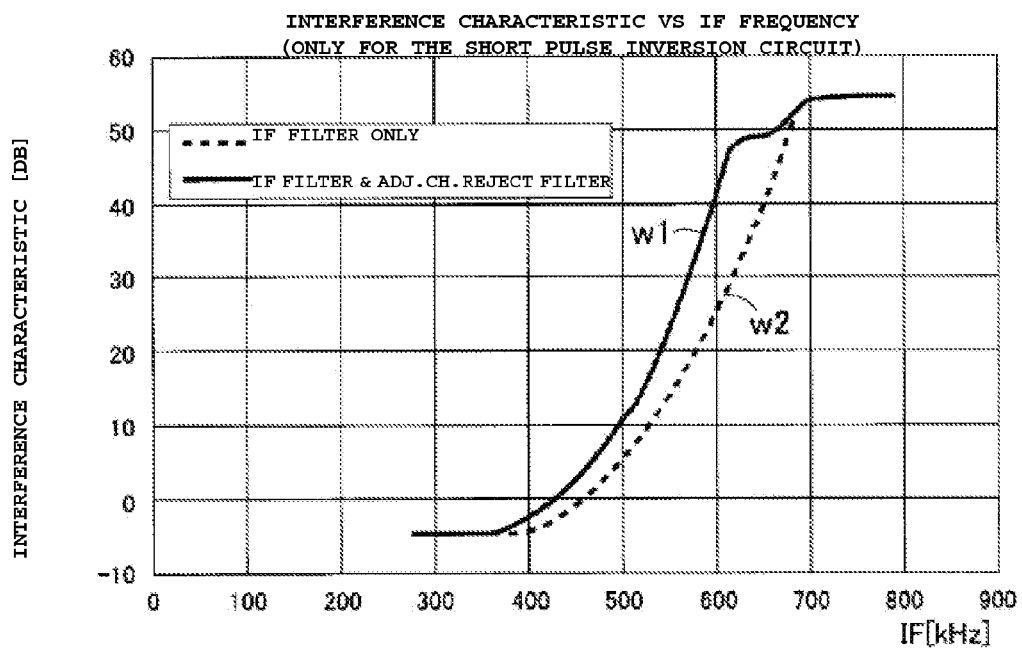
FIG. 6 is a graph depicting the interference characteristics of the adjacent-channel interference reject filter according to the first embodiment.

FIG. 6 is a graph depicting the interference characteristics of the adjacent-channel interference reject filter 1 shown in FIG. 1 to FIG. 3 in which the horizontal axis is the frequency (kHz) that is output from the adjacent-channel interference reject filter 1, and the vertical axis is the interference characteristics: undesired signal-to-desired signal (U/D) ratio (dB). The solid line waveform w1 shown in FIG. 6 indicates the interference characteristics with the adjacent-channel interference reject filter 1, and the dashed line waveform w2 indicates the interference characteristics without the adjacent-channel interference reject filter 1.

As understood from FIG. 6, the interference properties have been improved in the area at which the output frequency is 360 kHz to 700 kHz due to setting Up the adjacent-channel interference reject filter 1.

Figure 7:
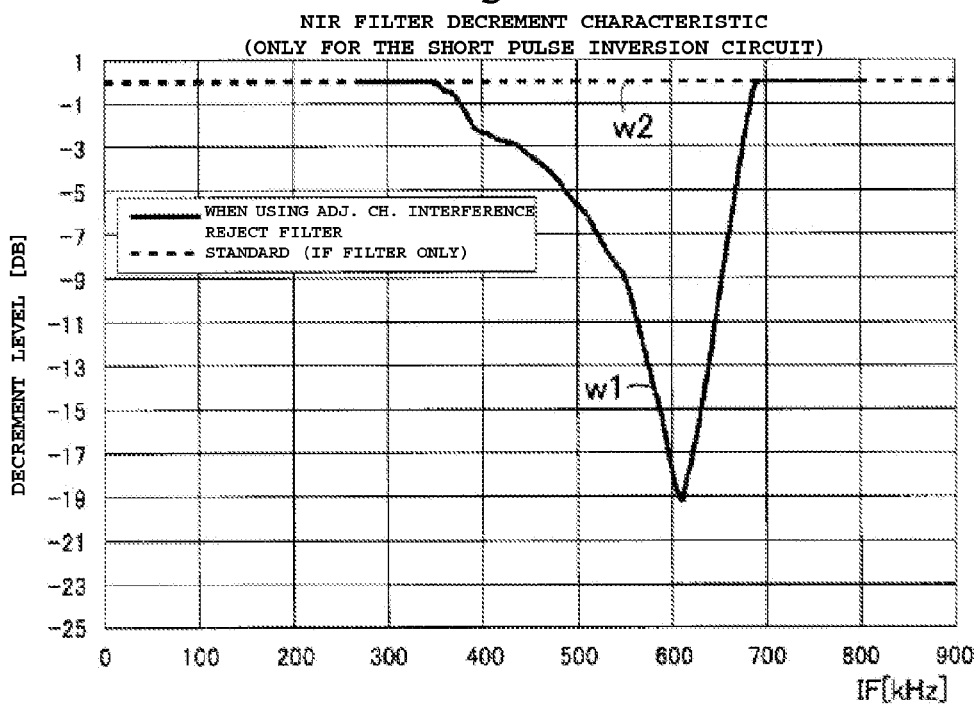
FIG. 7 is a graph depicting the attenuation properties of the adjacent-channel interference reject filter according to the first embodiment.

FIG. 7 is a graph depicting the attenuation properties of the adjacent-channel interference reject filter 1 shown in FIGS. 1 to 3 in which the horizontal axis is the frequency (kHz) that is output from the adjacent-channel interference reject filter 1, and the vertical axis is the attenuation level (dB). The solid line waveform w1 shown in FIG. 7 indicates the attenuation properties with the adjacent-channel interference reject filter 1, and the dashed line waveform indicates the attenuation properties when the adjacent-channel interference reject filter 1 is not provided but rather only the analog IF filter 6 is provided.

As understood from FIG. 7, the attenuation level is large in the vicinity of 600 kHz, which indicates so-called notch-type filter properties. From FIG. 7, it is clear that most of the short pulses with frequencies in the vicinity of 600 kHz can be rejected.

In FIG. 7, the attenuation level is at its peak in the vicinity of 600 kHz; however, it is possible to change the threshold level set by the detected-threshold level controller 16 shown in FIG. 3 to shift the frequency of the peak on the axis. In this way, the targeted interference signal can be rejected efficiently by controlling the threshold level and using the detected-threshold level controller 16 to match the threshold level with the frequency of the short pulse to be rejected.

As described above, the adjacent-channel interference reject filter 1 shown in FIG. 1 to FIG. 3 attenuates the desired signals within the desired wave-passing band; therefore, the structure that is needed to solve this problem may be considered.

Figure 8:
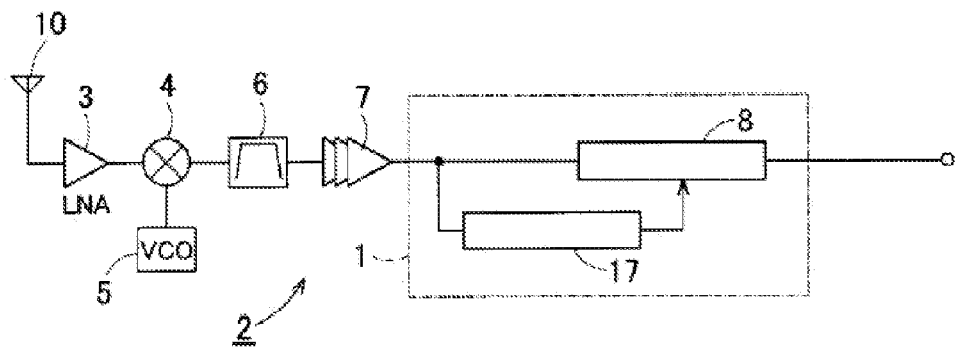
FIG. 8 is a block diagram depicting the schematic structure of the wireless communication device including the adjacent-channel interference reject filter according to the first embodiment.

FIG. 8 is a block diagram depicting the schematic structure of the wireless communication device 2 including the adjacent-channel interference reject filter 1 that functions to deal with the degradation in the sensitivity.

In the wireless communication device depicted in FIG. 8, the internal structure of the adjacent-channel interference reject filter 1 is different from the structure shown in FIG. 1.

The adjacent-channel interference reject filter 1 shown in FIG. 8 has an inversion controller 17 in addition to the short-pulse inverter 8.

The inversion controller 17 controls whether the short pulses detected by the short-pulse sensor 11 present in the short-pulse inverter 8 are to be inverted. In other words, the inversion controller 17 controls in such a manner that only the short pulses caused by interference signals are inverted without inverting the other short pulses, which may correspond to data signals, even though all the short pulses are detected by the short-pulse sensor 11. Due to this selectivity, the sensitivity of the desired signals present in the desired wave-passing band can be prevented from being degraded.

Figure 9:
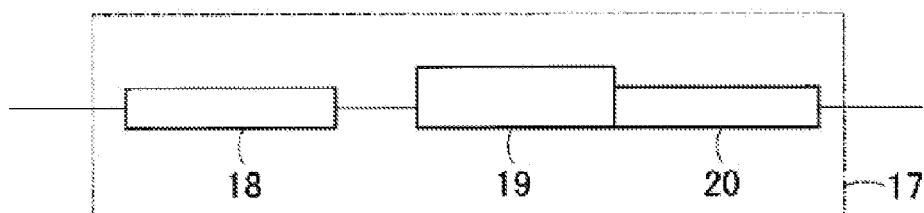
FIG. 9 is a block diagram depicting the internal structure of an inversion controller.

FIG. 9 is a block diagram depicting the internal structure of the inversion controller 17. The inversion controller 17 shown in FIG. 9 has a short-pulse sensor 18, a short-pulse counter 19 and an inversion-determining unit 20.

The short-pulse sensor 18 present in the inversion controller 17 may reuse the short-pulse sensor 11 shown in FIGS. 2 and 3. Or, it may be set independently from the short-pulse sensor 11 shown in FIGS. 2 and 3 and detect short pulses with another standard. An example with the short-pulse sensor 18 independently located from the short-pulse sensor 11 is described below.

The short-pulse counter 19 counts the short pulses detected by the short-pulse sensor 18 at each constant frequency. The inversion-determining unit 20 determines that the series of the short pulses in the period has been inverted excluding the case when the short pulses counted by the short-pulse sensor 18 at each constant frequency exceed a fixed number (the first standard level).

There occur temporarily the short pulses contained in the desired signal-passing band, so there rarely occur consecutively the short pulses at some frequency interval. On the other hand, there occur consecutively the short pulses contained in the interference signal at some frequency interval. Therefore, the inversion controller 17 shown in FIG. 9 controls the inversion of only the short pulses that appear continuously.

Figure 10:
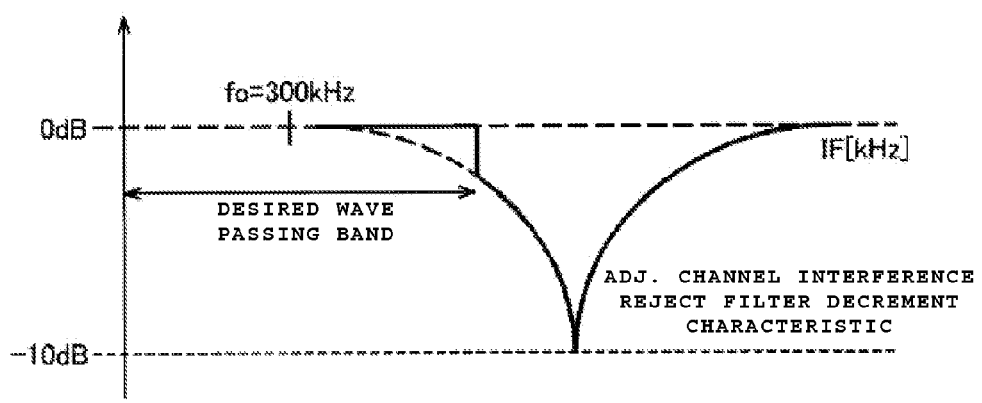
FIG. 10 is a conceptual graph depicting the attenuation properties of the interference signal of the adjacent-channel interference reject filter shown in FIG. 8.

FIG. 10 is a conceptual graph depicting the attenuation properties of the interference signal of the adjacent-channel interference reject filter 1 shown in FIG. 8. In this graph, the horizontal axis, the vertical axis and the type of signal waveform are the same as shown in FIG. 5. The graph shown in FIG. 10 differs from the graph shown in FIG. 5 in that the attenuation level in the desired wave-passing band is 0. Due to this difference, it is clear that the adjacent-channel interference reject filter 1 shown in FIG. 8 does not invert the desired wave even though the short pulses occur around the level of receiver sensitivity due to the interference and thereby there is no attenuation of the desired signals in the desired wave passing band.

Figure 11:
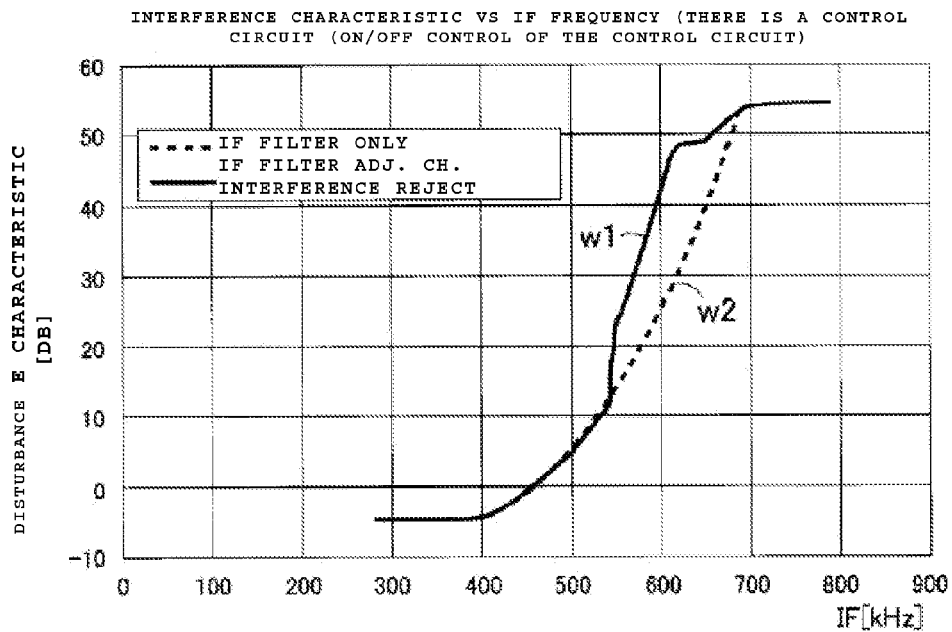
FIG. 11 is a graph depicting the interference properties of the adjacent-channel interference reject filter shown in FIG. 8.

FIG. 11 is a graph depicting the interference characteristics of the adjacent-channel interference reject filter 1 shown in FIG. 8 in which the horizontal axis, the vertical axis and the type of signal waveform are the same as shown in FIG. 6. The graph shown in FIG. 11 attenuates the interference only in the band area with frequencies from 550 to 700 kHz that are generated by the interference signals.

Figure 12:
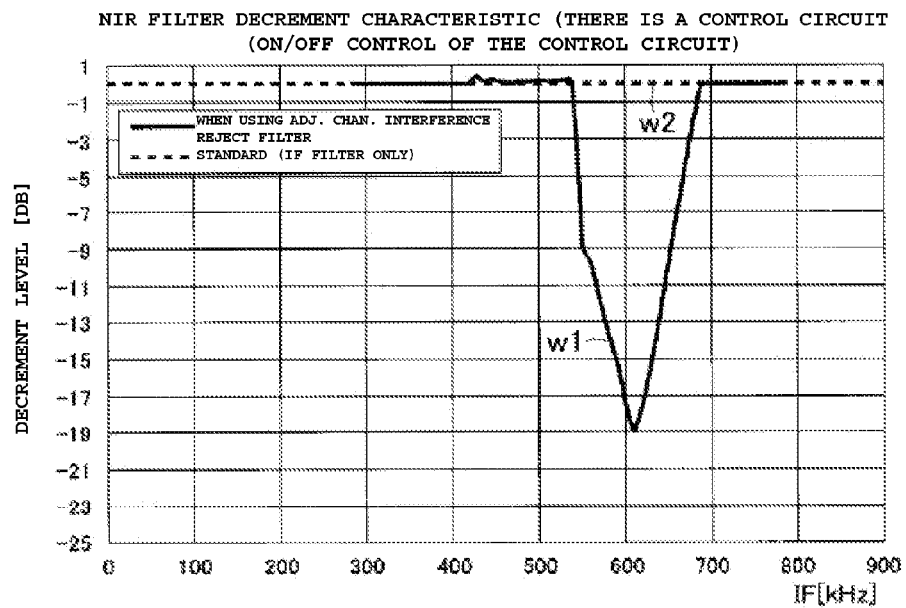
FIG. 12 is a graph depicting the attenuation properties of the interference signal of the adjacent-channel interference reject filter shown in FIG. 8.

FIG. 12 is a graph depicting the attenuation properties of the adjacent-channel interference reject filter 1 shown in FIG. 8 in which the horizontal axis, the vertical axis and the type of signal waveform are the same as shown in FIG. 7. It is shown in the graph of FIG. 12 that the attenuation at the frequencies less than or equal to 550 kHz is 0 different from FIG. 7.

Figure 13:
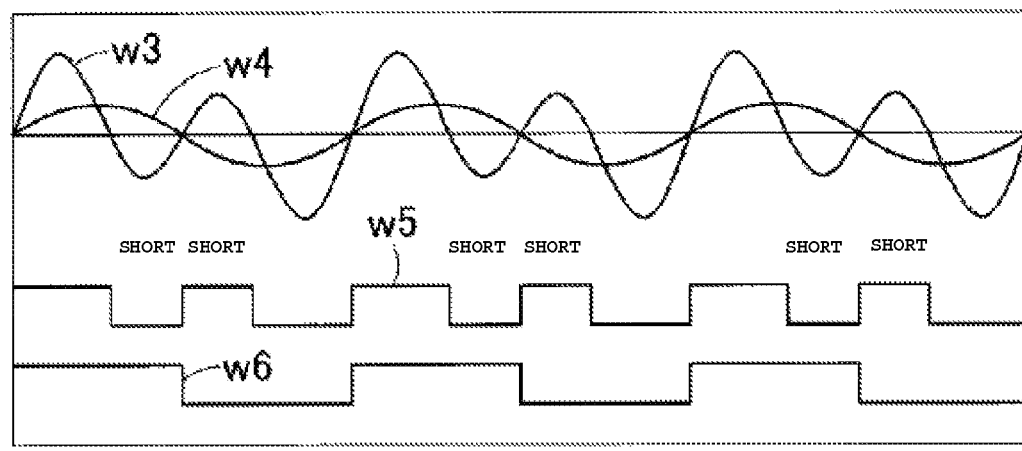
FIG. 13 depicts a waveform in which the desired signals and interference signals are combined.

FIG. 13 depicts a waveform w3 which is a combined desired signal and interference signal and output from the IF filter 6, a waveform w4 which is the desired signal and output from the IF filter 6, a waveform w5 which is output from the limiting amplifier 7, and a waveform w6 which is output from the short-pulse inverter 8, when the desired signal frequency is equal to 300 kHz, the interference signal frequency is equal to 600 kHz, and the amplitude of the interference signals is twice as the amplitude of the desired signals.

When the amplitude of the interference signals is greater than the amplitude of the desired signals, the waveform w5 that is output from the limiting amplifier 7 is in the same interval as the interval of the interference signals; however, the short pulses continue and appear twice in one interval. These short pulses are inverted by using the short-pulse inverter 8, and as shown in output waveform w6, the short pulses are rejected to obtain an output of only the desired signals.

In the case depicted in FIG. 13, best effect is achieved by reducing the interference at the frequency near the threshold level used to determine whether it is a short pulse. In addition, as shown in the waveform w5, the interference signal can be rejected easily because the pulse width of the short pulses is greatly different form that of other pulses.

Figure 14:
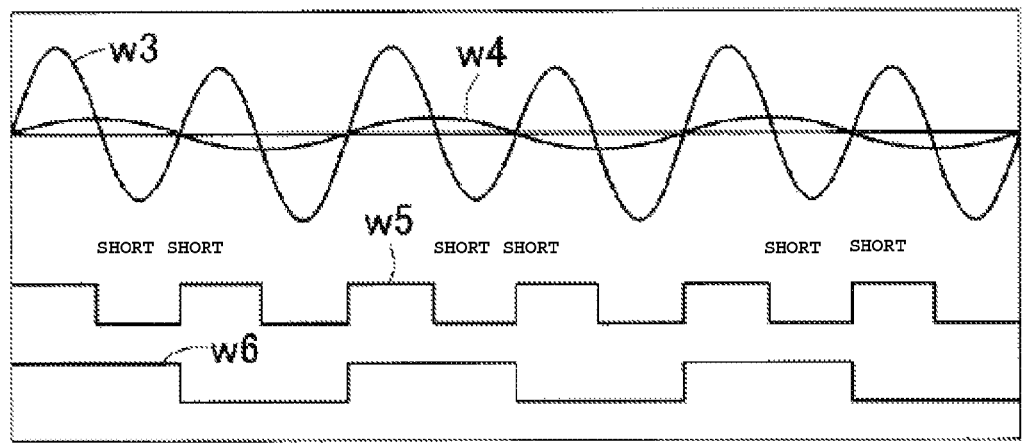
FIG. 14 depicts a waveform in which the desired signals and interference signals are combined.

FIG. 14 depicts a waveform w3 which is a combined desired signal and interference signal and output from the IF filter 6, a waveform w4 is the desired signal, the waveform w5 which is output from the limiting amplifier 7 and the waveform w6 which is output from the short-pulse inverter 8, when the desired signal frequency is equal to 300 kHz, the interference signal frequency is equal to 600 kHz, and the amplitude of the interference signal is five times as the amplitude of the desired signal.

In this case depicted in FIG. 14, the amplitude of the interference signal is much greater than the amplitude of the desired signal, and thus the differences in the pulse widths between the short pulses and the other pulses is less, thereby it is difficult to determine the short pulse. When the amplitude of the desired signal is near the detection threshold level, the desired signal can easily be affected by the interference, and the pulses of the waveform w5 output from the limiting amplifier 7 is also changed. So, it is difficult to reject the interference signal.

When the amplitude of the interference signal is greater than the amplitude of the desired signal, the probability of the continuous appearance of short pulses is greater, though their appearance also depends on the phase relationship between the desired signal and the interference signal. If there is only the desired signal, even under the noisy environment, the probability of the continuous appearance of short pulse is less.

Figure 15:
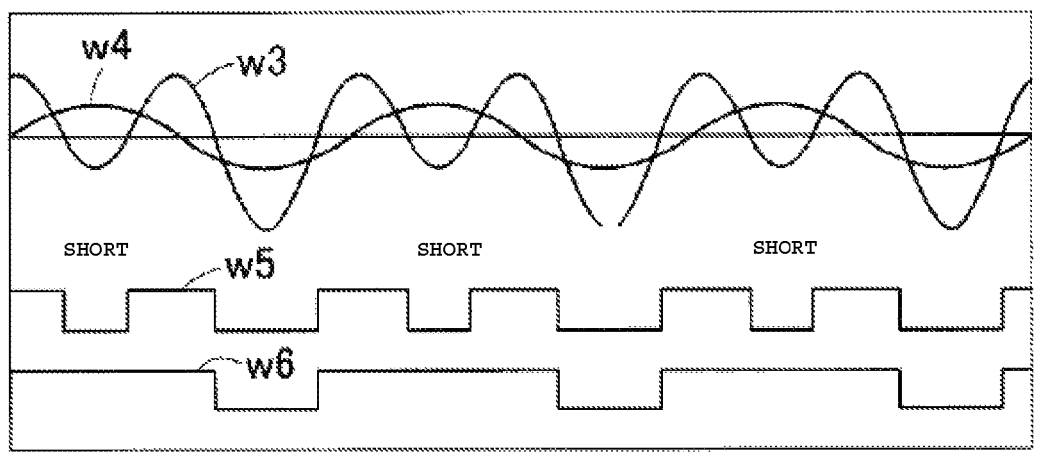
FIG. 15 depicts a waveform in which the desired signals and interference signals are combined.

FIG. 15 depicts a waveform w3 which is a combined desired signal and interference signal and output from the IF filter 6, a waveform w4 which is the desired signal and output from the IF filter 6, a waveform w5 which is output from the limiting amplifier 7, and the waveform w6 which is output from the short-pulse inverter 8, when the desired signal frequency is equal to 300 kHz, the interference signal frequency is equal to 600 kHz, and the amplitude of the interference signal is twice as the amplitude of the desired signal.

In this case shown in FIG. 15, a phase relationship in which there is no continuous appearance of short pulses exists. Though the duty of the waveform w5 that is output after the inversion of short pulses is shifted from 50%, the interval of the output waveform w5 is the same as the interval of the desired signals. When the phases between the desired signal and interference signal are not related to each other, gradually the phases are shifted and they may achieve a phase relationship similar to the phase relationship shown in FIG. 13.

According to the first embodiment, it is possible to efficiently reject the interference signal contained in the signal output from the limiting amplifier 7, by providing an adjacent-channel interference reject filter 1 after the analog IF filter 6, detecting the short pulses contained in the signal output from the limiting amplifier 7, and then inverting the detected short pulses are inverted. The adjacent-channel interference reject filter 1 can reject the interference signal by performing a simple method of inverting the detected short pulses. Due to its simplicity, the method can be implemented in a relatively small logic. According to the prior art, there is limitation to receive a desired signal when the amplitude of the desired signal is twice (+6 dB) the amplitude of a interference signal. On the other hand, according to this embodiment, it is possible to receive a desired signal even if the amplitude of the desired signal is ¼ (−12 dB) the amplitude of the a interference signal. As shown in FIGS. 7 and 12, the effect is 18 dB.

Though the sensitivity of the desired signal in the desired wave-passing band degrades when just inverting all of the short pulses detected, the degradation of the sensitivity of the desired signals can be suppressed with the inversion controller 17, which prevents inversion of short pulses other than those of the interference signal and thereby can reject only the interference signal.

Second Embodiment

In the second embodiment, the adjacent-channel interference reject filter 1 has a more specific internal structure.

Figure 16:
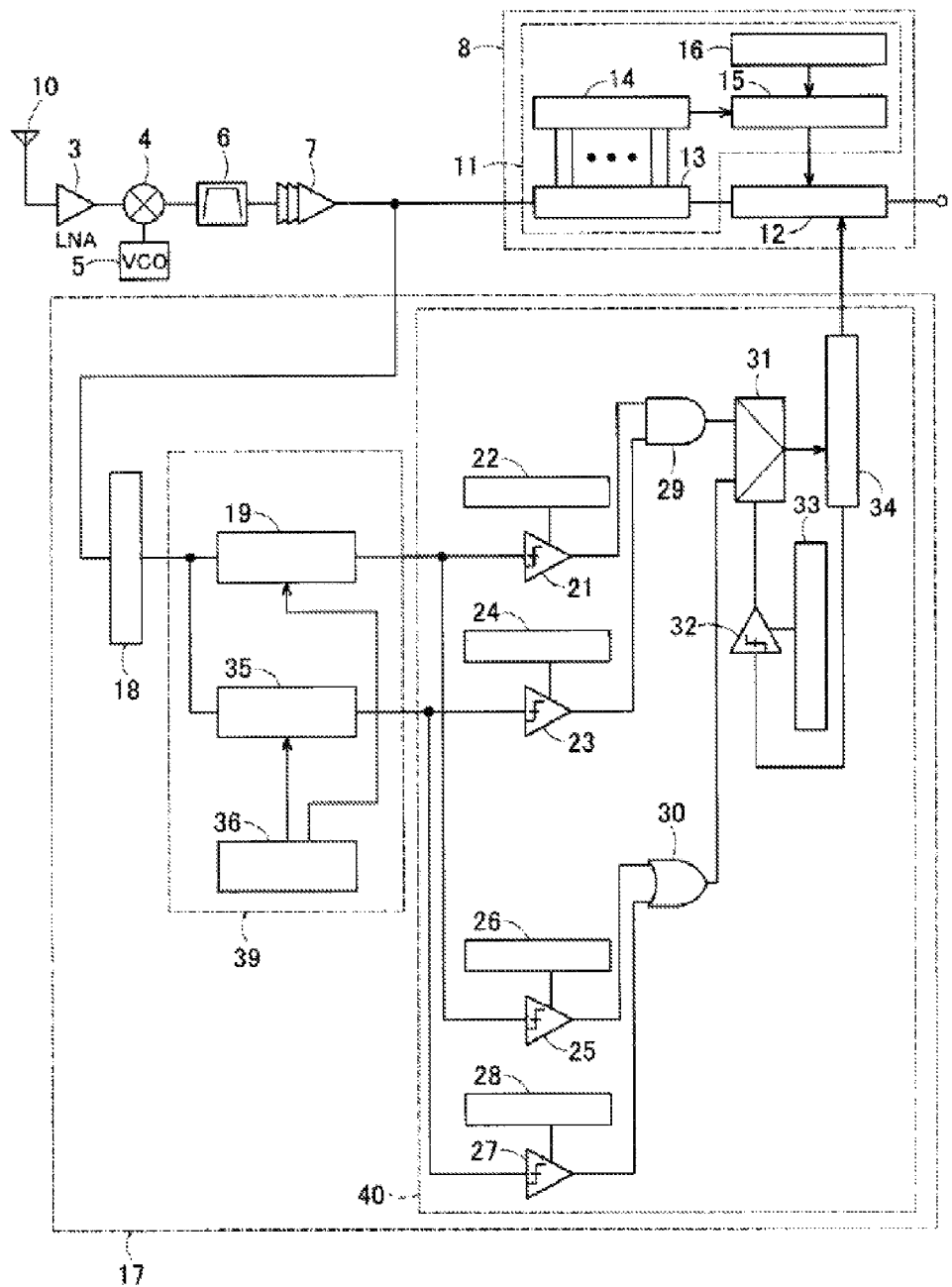
FIG. 16 is a block diagram depicting the schematic structure of a wireless communication device provided with an adjacent-channel interference reject filter according to a second embodiment.

FIG. 16 is a block diagram depicting the schematic structure of the wireless communication device 2 that is provided with a adjacent-channel interference reject filter 1 according to the second embodiment. The wireless communication device 2 depicted in FIG. 16 is, for example, a FM-receiving device for receiving FM signals.

Similar to the adjacent-channel interference reject filter 1 shown in FIG. 8, the adjacent-channel interference reject filter 1 present in the wireless communication device 2 shown in FIG. 16 has a short-pulse inverter 8 and an inversion controller 17. However, the internal structure of the inversion controller 17 is different from the internal structure shown in FIG. 8. These differences are mainly described below.

The inversion controller 17 shown in FIG. 16 has a short-pulse sensor 18, a short-pulse number calculator 39 and a determination logic circuit 40 with hysteresis.

The short-pulse inverter 8 shown in FIG. 16 has a short-pulse sensor 11 and a pulse inverter 12 similar to FIGS. 3 and 8. In addition, the short-pulse sensor 11 has a shift register 13, a pulse width-detecting part 14, a short pulse-determining unit 15 and a detected-threshold level controller 16. The detected-threshold level controller 16 controls the threshold level of the pulse width that the short pulse-determining unit 15 has determined to be a short pulse. The short-pulse sensor 11 detects short pulses with pulse widths that fulfill the threshold level determined by the detected-threshold level controller 16. The pulse inverter 12 inverts the short pulses detected by the short-pulse sensor 11 on the basis of the result by the determination logic circuit 40.

The short-pulse number calculator 39 has a short-pulse number counter 19, a continuous short-pulse number counter 35 and a count-interval controller 36.

The short-pulse number counter 19 calculates the number of short pulses that are output in a specified time. The continuous short-pulse number counter 35 calculates the continuous short pulses in the signals that are output from the limiting amplifier 7. The count-interval controller 36 sets the one-interval count, continuing the calculation with the short-pulse number counter 19 and the continuous short-pulse number counter 35.

When interference signals exist, there is high probability of continuous generation of the waveform w5 that is output from the limiting amplifier 7 shown in FIG. 8, as shown in FIG. 13. However, the probability of continuous generation of the waveform w5 is reduced by the generation of short pulses randomly when the interference is added to the signals of only desired waves. Therefore, accuracy in detecting the existence of interference can be increased by counting the short-pulse number continuously.

The determination logic circuit 40 has a first short-pulse number comparator 21, a first threshold level controller 22 for the first short-pulse number comparator 21, a first continuous short-pulse number comparator 23, a second threshold level controller 24 for the first continuous short-pulse number comparator 23, a second short-pulse number comparator 25, a third threshold level controller 26 for the second short-pulse number comparator 25, a second continuous short-pulse number comparator 27, a forth threshold level controller 28 for the second continuous short-pulse number comparator 27, an AND circuit 29, an OR circuit 30, a selector 31, a selector-control comparator 32, a fifth threshold level controller 33 for the selector-control comparator 32 and a determination result-holding unit 34 to hold the determination result of the last N times.

The first short-pulse number comparator 21 compares the short-pulse number calculated by the short-pulse number counter 19 with the threshold level (the first standard level) set in the first threshold level controller 22, and when the calculated short-pulse number is greater than or equal to the threshold level, the output is high indicating that the short-pulse inversion process becomes valid.

The basic operation of the second short-pulse number comparator 25 is also the same as the operation of the first short-pulse number comparator 21, but the threshold level is different. The third threshold controller 26 for the second short-pulse number comparator 25 sets the threshold level to less than the threshold level of the first threshold controller 22. Once the output of the first short-pulse number comparator 21 and the second short-pulse number comparator 25 has been determined to be "valid," it is possible to set up the hysteresis to make it easier to determine further outputs to be "valid."

The first continuous short-pulse number comparator 23 compares the short-pulse number calculated by the continuous short-pulse number counter 35 with the threshold level (the second standard level) set by the second threshold controller 24, and when the calculated continuous short-pulse number is greater than or equal to the threshold level, the output is high indicating that the short-pulse inversion process becomes valid.

The basic operation of the second continuous short-pulse number comparator 27 is also the same as the operation of the first continuous short-pulse number comparator 23, but the threshold level is different. The fourth threshold controller 28 for the second continuous short-pulse number comparator 27 sets the threshold level to less than the level of the second threshold controller 24. Once the output of the first continuous short-pulse number comparator 23 and the second continuous short-pulse number comparator 27 has been determined to be "valid," it is possible to set up the hysteresis to make it easier to determine further outputs to be "valid."

The AND circuit 29 outputs AND signals that are combined outputs of the first short-pulse number comparator 21 and the first continuous short-pulse number comparator 23. The OR circuit 30 outputs OR signals that are combined outputs of the second short-pulse number comparator 25 and the second continuous short-pulse number comparator 27.

The selector 31 selects either output of the AND circuit 29 or output of the OR circuit 30, referring to the selector control comparator 32. First, output of the AND circuit 29 is selected to become high the threshold level when recognizing them as a short pulse. The output of the AND circuit 29 becomes high when the short-pulse number calculated by the first short-pulse number comparator 21 is determined to have crossed the threshold level and when the continuous short-pulse number calculated by the first continuous pulse number comparator is determined to have crossed the threshold level. Therefore, the selector 31 determines the detected short pulse to be "valid" when these two determination conditions are fulfilled for the first time, and then it instructs the short-pulse inverting circuit 11 to invert the short pulses.

The pulse inverter 12 inverts the short pulses from the limiting amplifier 7 that are in the next interval of the counting interval set by the counting-cycle controller 36 in the case when the output is high indicating that output from the selector 31 becomes valid.

The determination result-holding unit 34 holds the output from the selector 31 of the past N intervals. As the output from the selector 31 changes in each interval, the determination result-holding unit 34 holds the N intervals of output from the selector 31. In addition, among the results held for N intervals (where N is 3 or more), if the results held for greater than or equal to (N−A) times are "valid," the short pulses may be inverted by the pulse inverter 12 without depending on the result from the selector 31, and if the results held for less than or equal to (N−B) times are "valid", the short pulse may not be inverted by the pulse inverter 12 without depending on the result from the selector 31. In that circumstance, the relationship is N>B>A>0 (where A and B are integers)

The pulse inverter 12 determines the detected short pulses to be "valid" when the output from the selector 31 is high, and it inverts the pulses. It determines the detected short pulses to be "invalid" when the output from the selector 31 is low, and it does not invert them.

The selector control comparator 32 refers to the output from the past N intervals from the selector 31 that are held in the determination result-holding unit 34. The selector 31 selects the signals of the AND circuit 29 output when the "valid" number does not exceed the threshold level set in the fifth threshold level controller 33, and it selects the signals output from the OR circuit 30 when the "valid" number exceeds the threshold level set in the fifth threshold level controller 33.

The signals output from the OR circuit 30 become high when the second short-pulse number comparator 25 determines that the short-pulse number has exceeded the threshold level or when the second continuous short-pulse number comparator determines that the continuous short-pulse number has exceeded the threshold level. In other words, the selector 31 can easily determine the short-pulse number to be more "valid" by selecting the signals output from the OR circuit 30.

In this way, the determination logic circuit 13 cannot simply determine the short pulses to be "valid" when large numbers of short pulses are determined to be "invalid," but it can simply determine the short pulse to be "valid" when large numbers of short pulses are determined to be "valid." By setting hysteresis in the determination logic, the threshold level for determining whether a pulse is short does not change frequently, and the determination logic is stabilized.

The settings for using the determination logic with hysteresis may be changed. For example, when hysteresis is not set, the selector 31 may select the output from either the AND circuit 29 or the OR circuit 30.

In the example shown in FIG. 16, two types of determination logics are shown (i.e., whether the short pulse number in a constant duration has exceeded the threshold level and whether the continuous short-pulse number has exceeded the threshold level have been set, and any one among them can be set).

The short-pulse sensor 8 detects the short pulses widths that fulfill the threshold level decided by the detected threshold level controller 16. However, a beard-shaped pulse with a very narrow pulse width may appear among the signals that are output from the limiting amplifier 7. If the inversion process is attempted on such heard-shaped pulses by treating them as short pulses, the short-pulse inversion process may have to be carried out very often, causing the process to be complex and thereby reducing accuracy.

Therefore, the short-pulse sensor 8 might not treat the beard-shaped pulses with narrow widths that do not have connections with the interference signals as short pulses. Specifically, a lower limit is set for the pulse width, and the pulses with widths less than or equal to the lower limit are excluded from the short pulses.

In the example shown in FIG. 16, the short-pulse number and continuous short-pulse number have been used as the threshold for determining whether the short pulse is to be inverted or not. However, in addition to the determination threshold or by changing the determination threshold, the average frequency of the signals that are output from the limiting amplifier 7 can be found, and then whether the interference signals are present may be determined from the detected average frequency.

Figure 17:
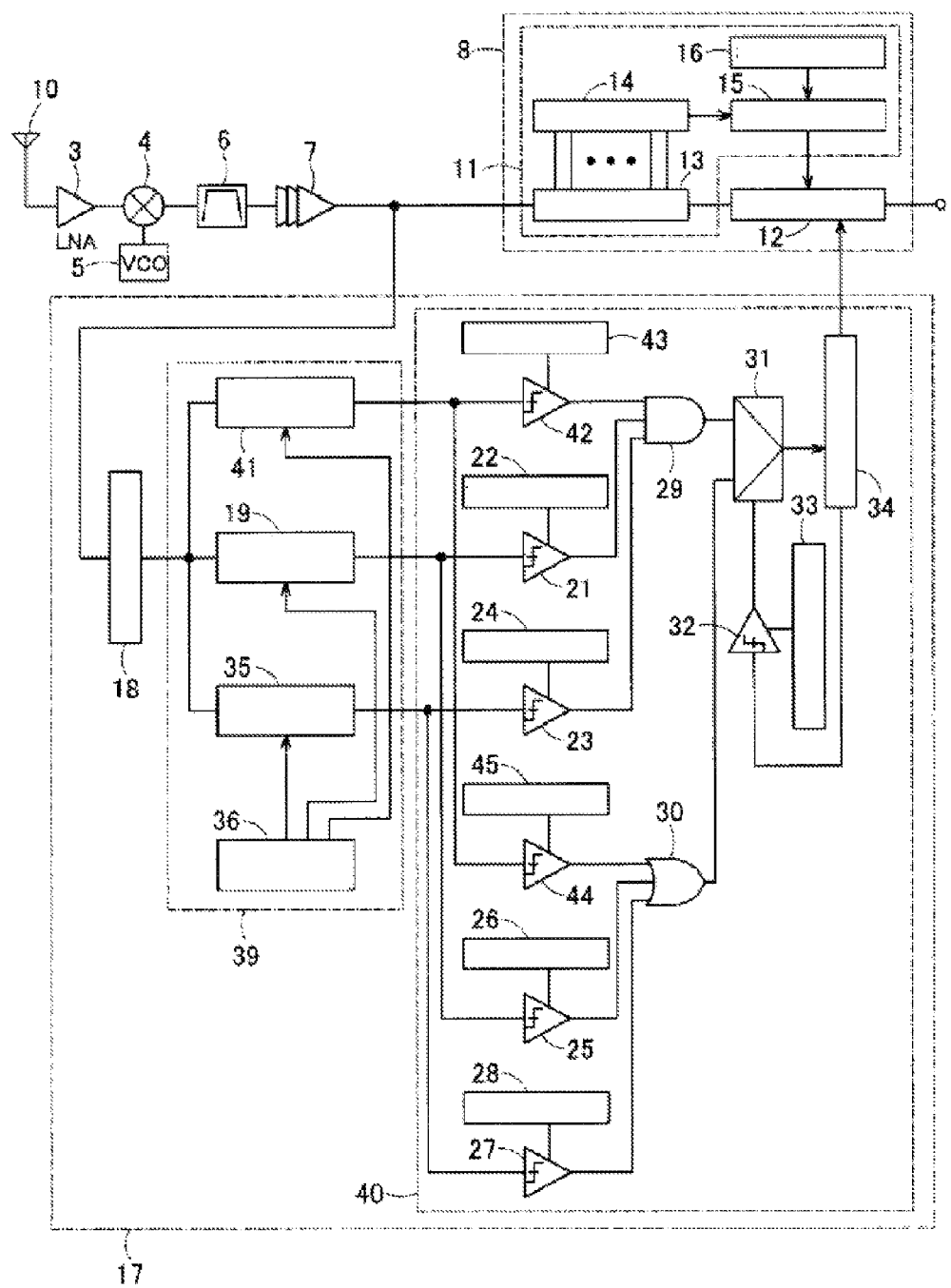
FIG. 17 is a block diagram depicting the schematic structure of a wireless communication device in which a process for detecting and comparing the average frequency has been added to the structure shown in FIG. 8.

FIG. 17 is a diagram in which the process of determining whether the interference signals are present using the detected average frequency has been added in addition to the structure shown in FIG. 16. An increase in the percentage of short pulses among the signals output from the limiting amplifier 7 increases the average frequency of the output signals. Therefore, the percentage of short pulses contained in the signals output from the limiting amplifier 7 can be guessed by comparing the average frequency with the threshold level. More specifically, when the average frequency is greater than the threshold level, it can be determined that the percentage of short pulses among the signals output from the limiting amplifier 7 is greater.

The short-pulse number calculator 39 shown in FIG. 17 has an average-frequency sensor 41 in addition to the short-pulse number calculator 39 shown in FIG. 16. The average-frequency sensor 41 detects the average frequency of the signals that are output from the limiting amplifier 7 after every constant duration.

The determination logic circuit 13 with hysteresis shown in FIG. 17 has a first average-frequency comparator 42, a sixth threshold level controller 43 for the first average-frequency comparator 42, a second average-frequency comparator 44 and a seventh threshold level controller 45 for the second average frequency comparator 44 in addition to the determination logic circuit 13 shown in FIG. 16.

The first average-frequency comparator 42 compares the average frequency detected by the average-frequency sensor 41 and the threshold level (the third standard level) set by the sixth threshold level controller 43, and if the average frequency is greater than or equal to the threshold level, it outputs signals of high logic to indicate that the short pulses are "valid."

The basic operation of the second average-frequency comparator 44 is also similar to the basic operation of the first average-frequency comparator 42, but the threshold level is different. The seventh threshold level controller 45 for the second average-frequency comparator 44 sets the threshold level to less than the threshold level set by the sixth threshold level controller 43. Due to this setting, once the outputs from the first average-frequency comparator 42 and the second average-frequency comparator 44 have been selected and determined to be "valid," it is possible to set up the hysteresis to make it easier to determine further outputs to be "valid."

The AND circuit 29 of the determination logic circuit 13 shown in FIG. 17 generates the AND signals output from the first short-pulse number comparator 21, the signals output from the first continuous short-pulse number comparator 23 and the signals output from the first average frequency comparator 42. In addition, the OR circuit 30 generates the OR signals output from the second short-pulse number comparator 25, the signals output from the second continuous short-pulse number comparator 27 and the signals output from the second average-frequency comparator 44.

The selector 31 selects the signals output from the AND circuit 29 and then selects the signals output from the OR circuit 30. Due to this selection, it is possible to set the hysteresis in the determination logic of whether the short pulses can be inverted.

In this way, in the second embodiment, the short pulses are actually inverted after determining whether the short pulses are to be inverted by using the short-pulse number and continuous short-pulse number contained in the signals output from the limiting amplifier 7, and therefore, the short pulses can be inverted only when the short pulses are assumed to be the interference signals, thereby making it possible to reject the interference signals while maintaining the original properties of the signals as far as possible.

Other Applied Examples

Figure 18:
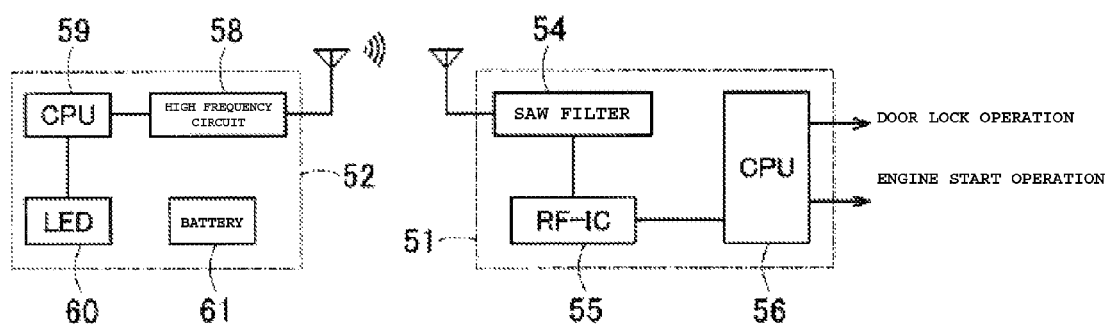
FIG. 18 is a block diagram depicting the schematic structure of a keyless entry device with a built-in wireless communication device.

The wireless communication device 2 according to the first and the second embodiments can be applied to a remote keyless entry system. FIG. 18 is a block diagram depicting the schematic structure of a remote keyless entry system 51 with a built-in wireless communication device 2 according to either the first or the second embodiments. The keyless entry device 51 shown in FIG. 18 is provided inside the vehicle to control the door lock of the vehicle and/or to control engine activation.

The remote keyless entry system 51 shown in FIG. 18 is provided with an antenna 53 to receive FM (Frequency Modulation) waves sent from a mobile key 52, a SAW (surface acoustic wave) filter 54, an RF-IC 55 and a CPU 56 with a built-in wireless communication device according to the first and the second embodiments.

The mobile key 52 is provided with an antenna 57, a high frequency (RF) circuit 58, a CPU 59 and a light-emitting diode (LED) 60.

The remote keyless entry system 51 provides the received data to the CPU 56 after removing the interference signals by inverting the short pulses using the adjacent-channel interference reject filter 1 present in the RF-IC 55 after receiving the FM waves from the mobile key 52. The CPU 56 controls the door locks and engine activation by analyzing the contents of the received data.

Note that, the wireless communication device 2 according to the first and the second embodiments can also be applied to the various types of devices other than the remote keyless entry system 51 for vehicle. For example, it can be applied to the remote controller of an audio-visual (AV) machine, for example a TV, the ON/OFF control and photo-chromic control of a lighting system, the opening and closing control of a garage door or the doors of houses and the opening and closing control of a cashbox, etc.

In FIG. 16 described above, the short-pulse inversion process is valid only when the short-pulse number calculated by the short-pulse number counter 19 is greater than or equal to the threshold level set by the first threshold level controller 22, and when the short-pulse number calculated by the continuous short-pulse number counter 35 is greater than or equal to the threshold level set by the second threshold level controller 24. However, the validity of the short-pulse inversion process may be determined on the basis of any one-decision result. In this case, a separate comparator for setting the hysteresis may be provided by corresponding to the comparator used to obtain the determination result.

Similarly, in FIG. 17, the short-pulse inversion process is valid only when the short-pulse number calculated by the short-pulse number counter 19 is greater than or equal to the threshold level set by the first threshold level controller 22, and when the short-pulse number calculated by the continuous short-pulse number counter 35 is greater than or equal to the threshold level set by the second threshold level controller 24. However, the validity of the short-pulse inversion process may be determined on the basis of at least one determination result from the three determination results. In this case, the separate comparator for setting the hysteresis may be provided by corresponding with the comparator used to obtain the determination result.

While certain embodiments have been described, these embodiments have been presented by way of example only, and are not intended to limit the scope of these inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An adjacent-channel interference reject filter, comprising:
    a short-pulse inverter including:
        a short-pulse sensor configured to detect a pulse in an intermediate frequency signal having a pulse width less than or equal to a predetermined width; and
        a pulse inverter configured to invert the pulse detected by the short-pulse sensor.

2. The adjacent-channel interference reject filter of claim 1, wherein the short pulse sensor includes:
    a shift register configured to sample the intermediate frequency signal at a constant frequency;
    a pulse-width sensor configured to count a sampling number of the intermediate frequency signal and to detect a pulse width from the counted sampling number;
    a detection-threshold level controller configured to set a threshold pulse width; and
    a short-pulse determining unit configured to compare the detected pulse width with the threshold pulse width to determine whether the pulse is a short pulse.

3. The adjacent-channel interference reject filter of claim 1, further comprising:
    an inversion controller configured to control the short-pulse inverter to invert only a subset of short pulses, wherein the subset comprises short pulses which repeat continuously at constant frequency for more than a specified number of times.

4. The adjacent-channel interference reject filter of claim 3, wherein the inversion controller comprises:
  a second short-pulse sensor configured to detect a pulse in the intermediate frequency signal with a pulse width less than or equal to a second predetermined width;
  a short pulse counter configured to count a number of pulses detected by the second short-pulse sensor;
  an inversion-determining unit configured to determine whether the short pulses are to be inverted, wherein the determination is based on whether the short pulses repeat at constant frequency for more than the specified number of times.

5. The adjacent-channel interference reject filter of claim 3, wherein the inversion controller comprises:
  a short pulse counter configured to count a number of pulses detected by the short-pulse sensor;
  an inversion-determining unit configured to determine whether the short pulses are to be inverted, wherein the determination is based on whether the short pulses repeat at constant frequency for more than the specified number of times.

6. The adjacent-channel interference reject filter of claim 2, further comprising:
  an inversion controller configured to control the short-pulse inverter to invert only a subset of short pulses, wherein the subset comprises short pulses which repeat continuously at constant frequency for more than a specified number of times, wherein the inversion controller includes:
    a second short-pulse sensor configured to detect a pulse in the intermediate frequency signal having a pulse width less than or equal to a second predetermined width;
    a short-pulse number calculator configured to count short pulses detected by the second short-pulse sensor during a specified interval time; and
    a determination logic circuit configured to determine whether a detected short pulse should be inverted on the basis several detection intervals.

7. The adjacent-channel interference reject filter of claim 6, wherein the determination logic circuit is configured to determine whether the detected short pulse should be inverted by using a detected average frequency of short pulses.

8. The adjacent-channel interference reject filter of claim 3, wherein the inversion controller is configured to operate with a hysteresis.

9. The adjacent-channel interference reject filter of claim 1, wherein the intermediate frequency signal is a frequency modulated signal.

10. A wireless communication device, comprising:
  an amplifier configured to amplify a radio frequency signal received by an antenna;
  a mixer configured to convert the radio frequency signal into an intermediate frequency signal;
  an analog filter configured to reject interference in the intermediate frequency signal;
  a limiting amplifier configured to amplify the intermediate frequency signal output from the analog filter; and
  a adjacent-channel interference reject filter configured to reject a adjacent-channel interference signal from the intermediate frequency signal output from the limiting amplifier;
  wherein the adjacent-channel interference reject filter includes a short-pulse inverter configured to invert pulses in the intermediate signal with a pulse width less than or equal to a predetermined width.

11. The wireless communication device of claim 10, wherein the adjacent-channel interference reject filter further includes:
  an inversion controller configured to control the short-pulse inverter to invert only a subset of detected short pulses.

12. The wireless communication device of claim 11, wherein the inversion controller includes:
  a short-pulse counter configured to measure a number of short pulses per time; and
  a short-pulse comparator to determine whether the number of short pulses per time exceeds a first standard level;
  wherein the short-pulse inverter is controlled to invert a detected pulse when the comparator determines that the first standard level has been exceeded.

13. The wireless communication device of claim 12, wherein the short-pulse comparator is configured to reduce the first standard level after determining that the number of short pulses per time has exceeded the first standard level.

14. The wireless communication device of claim 11, wherein the inversion controller includes:
  a consecutive short-pulse counter configured to measure a number of consecutive short pulses included in the intermediate signal; and
  a consecutive short-pulse comparator configured to determine whether the number of consecutive short pulses exceeds a second standard level;
  wherein the short-pulse inverter inverts a detected pulse when the second standard level has been exceeded.

15. The wireless communication device of claim 14, wherein the consecutive short-pulse comparator is configured to reduce the second standard level after determining that the number of short pulses measured with the consecutive short-pulse counter has exceeded the second standard level.

16. The wireless communication device of claim 11, wherein the inversion controller includes:
  an average frequency sensor configured to detect an average frequency of the intermediate frequency signal; and
  an average-frequency comparator configured to determine whether the average frequency has exceeded a third standard level;
  wherein the short-pulse inverter inverts a detected pulse when the average frequency exceeds the third standard level.

17. The wireless communication device of claim 16, wherein the average-frequency comparator reduces the third standard level after determining that the average frequency has exceeded the third standard level.

18. The wireless communication device of claim 11, further comprising:
  a determination result-holding unit configured to retain a determination result of the last three or more intervals, the determination result indicating whether or not to invert a detected pulse;
  wherein the short-pulse inverter is controlled to invert a next detected pulse if a interval number of previous interval determination results indicating the detected pulse was to be inverted is less than a first threshold level, and to not invert the next detected pulse if the interval number of previous interval determination results indicating the detected short pulse was to be inverted is greater than a second threshold level, the first threshold level less than the second threshold level.

19. The wireless communication device of claim 10, wherein the adjacent-channel interference reject filter includes:

a short-pulse sensor configured to detect pulses in the intermediate frequency signal that are wider than a first standard width and less than a second standard width.

20. A keyless entry device, comprising:
an antenna configured to receive a radio frequency signal transmitted by a mobile key;
an amplifier configured to amplify the radio frequency signal received by the antenna;
a mixer configured to convert the signal from the amplifier into an intermediate frequency signal;
an analog filter to reject a interference signal from the intermediate frequency signal;
a limiting amplifier configured to amplify the intermediate frequency output from the analog filter;
an adjacent-channel interference reject filter configured to reject an adjacent-channel interference from the intermediate frequency signal output from the limiting amplifier;
wherein the adjacent-channel interference reject filter includes:
a short-pulse sensor configured to detect a pulse in an intermediate frequency signal having a pulse width less than or equal to a predetermined width;
a pulse inverter configured to invert the pulse detected by the short-pulse sensor; and
an inversion controller configured to control the short-pulse inverter to invert only a subset of detected pulses.

* * * * *